(12) United States Patent
Miki et al.

(10) Patent No.: US 11,161,069 B2
(45) Date of Patent: Nov. 2, 2021

(54) POROUS MEMBRANE

(71) Applicant: ASAHI KASEI KABUSHIKI KAISHA, Tokyo (JP)

(72) Inventors: Yuki Miki, Tokyo (JP); Hirokazu Fujimura, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/845,101

(22) Filed: Apr. 10, 2020

(65) Prior Publication Data
US 2020/0324233 A1    Oct. 15, 2020

(30) Foreign Application Priority Data

Apr. 11, 2019    (JP) .............................. JP2019-075770

(51) Int. Cl.
*B01D 39/14*    (2006.01)

(52) U.S. Cl.
CPC ...... *B01D 39/14* (2013.01); *B01D 2239/1216* (2013.01); *B01D 2325/021* (2013.01); *B01D 2325/24* (2013.01)

(58) Field of Classification Search
CPC .... B01D 39/14; B01D 39/1692; B01D 69/08; B01D 71/76; B01D 2325/022; B01D 2325/24; B01D 61/145; B01D 69/02; B01D 71/34; B01D 2239/1216; B01D 2325/021
See application file for complete search history.

(56) References Cited

U.S. PATENT DOCUMENTS 6,322,703 B1 * 11/2001 Taniguchi .............. B01D 63/02
                                                        210/636
2019/0247801 A1    8/2019 Miki et al.

FOREIGN PATENT DOCUMENTS

WO    2017217446 A1    12/2017

* cited by examiner

*Primary Examiner* — Vishal V Vasisth
(74) *Attorney, Agent, or Firm* — Kenja IP Law PC

(57) ABSTRACT

Provided is a porous membrane which has a high water permeability performance, a high blocking performance, and a durability performance against loads of long-term and high operation pressures, which are suitable for filtering applications. The porous membrane includes one surface to be on a side of a filtrate; and the other surface to be on a side of a liquid to be filtered, wherein a surface pore diameter index of the one surface is 2.5 or more, the surface pore diameter index being determined by dividing a pore diameter in a top surface by a pore diameter in a second top surface.

11 Claims, 3 Drawing Sheets

Example of pore in top surface

Example of pore in second top surface

POROUS MEMBRANE

TECHNICAL FIELD

The present disclosure relates to a hollow fiber membrane module.

BACKGROUND

Filtration processes have been widely used in industrial fields, such as manufacturing of sterile water, high purity water, or drinking water, and purification of the air. Recently, its applications are expanding into other fields such as secondary or tertiary treatment in sewage treatment plants for domestic wastewater, industrial wastewater and the like, and highly turbid water treatment, e.g., solid-liquid separation in septic tanks.

As a filter material used for such filtration processes, a hollow fiber membrane in which a polymer excellent in processability is formed in a hollow tube shape, a flat membrane in which a polymer is formed in a sheet form, and the like, and a membrane module formed by assembling these membranes are used.

Particularly in clarification of river water to be used as tap water or the like, three performances are required: a high blocking performance, a high water permeability performance for treating a large amount of water, and high strength for enabling long-term use under a wide range of operating conditions including a high operating pressure.

Of these performances required for porous membranes used in membrane modules, the blocking performance capable of reliably removing viruses and bacteria is important in the field of water treatment since they affect the quality of filtered water. The porous membranes are also required to have a high water permeability performance while maintaining the blocking performance.

WO 2017/217446 (PTL 1) proposes a porous membrane having a high removal rate of viruses, a high water permeability performance, and a high compressive strength by specifying the cross-sectional pore diameter in the thickness direction. This porous membrane, however, has a reduced durability against a long-term compressive creep, and hence further enhancement of the durability is needed.

CITATION LIST

Patent Literature

PTL 1: WO 2017/217446

SUMMARY

It could be helpful to provide a porous membrane which has a high water permeability performance, a high blocking performance, and a durability performance against loads of long-term and high operation pressures, which are suitable for filtering applications.

We have made earnest studies to solve the aforementioned problem, and accomplished the present disclosure.

Specifically, the present disclosure provides the following.

[1] A porous membrane comprising:
one surface to be on a side of a filtrate; and
the other surface to be on a side of a liquid to be filtered,
wherein a surface pore diameter index of the one surface is 2.5 or more, the surface pore diameter index being determined by dividing a pore diameter in a top surface by a pore diameter in a second top surface.

[2] The porous membrane according to [1], wherein the pore diameter in the top surface of the one surface is 1.0 μm or more.

[3] The porous membrane according to [1] or [2], wherein a ratio of the pore diameter in the top surface of the one surface to a pore diameter in the other surface is 30 or more.

[4] The porous membrane according to any one of [1] to [3], wherein the pore diameter in the other surface is 60 nm or less.

[5] The porous membrane according to any one of [1] to [4], wherein the porous membrane has a compressive strength of 0.30 MPa or more.

[6] The porous membrane according to any one of [1] to [5], wherein, when a thickness position of the other surface and a thickness position of the one surface in a thickness direction are defined as 0 and 1, respectively, and the thickness of the porous membrane is divided into 10 regions for normalizing positions in the thickness direction as thickness positions, a cross-sectional pore diameter in a region with a thickness position of 0.9 to 1.0 is 0.5 μm or more.

[7] The porous membrane according to any one of [1] to [6], wherein porous membrane has a compressive creep coefficient of −0.014 or more.

[8] The porous membrane according to any one of [1] to [7], wherein
the porous membrane is in a form of a hollow fiber membrane, and
a difference of surface pore diameter indices at two points of the one surface is 1.3 or less, the two point facing to each other, having a center of a flow path in the hollow fiber membrane interposed therebetween.

[9] The porous membrane according to any one of [1] to [8], wherein the porous membrane contains a vinylidene fluoride-based resin as a main component.

[10] The porous membrane according to any one of [1] to [9], wherein the porous membrane contains a copolymer of vinylidene fluoride and hexafluoropropylene, as the main component.

[11] The porous membrane according to any one of [1] to [10], wherein the porous membrane contains a copolymer of vinylidene fluoride and chlorotrifluoroethylene, as the main component.

According to the present disclosure, a porous membrane is provided which has a high water permeability performance, a high blocking performance, and a durability performance against loads of long-term and high operation pressures, which are suitable for filtering applications.

DETAILED DESCRIPTION

Figure 1:
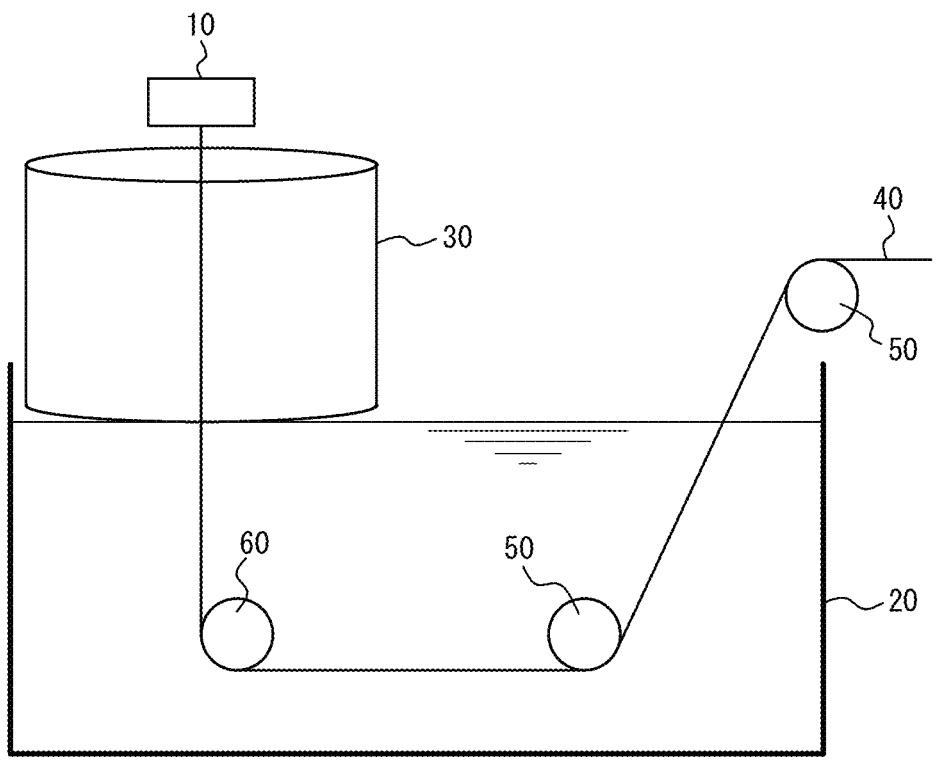
FIG. 1 illustrates an example of a manufacturing apparatus for manufacturing hollow-shaped porous membranes.

An embodiment of the present disclosure will be described in detail below.

A porous membrane of the present embodiment includes one surface to be on a side of a filtrate; and the other surface to be on a side of a liquid to be filtered, wherein a surface pore diameter index of the one surface is 2.5 or more, the surface pore diameter index being determined by dividing a pore diameter in a top surface by a pore diameter in a second top surface.

The porous membrane of the present embodiment contains, as the main component, a vinylidene fluoride-, hexafluoropropylene-, chlorotrifluoroethylene-, or polysulfone-based resin as a polymer component composing the membrane, for example. As used herein, the expression "containing . . . as the main component" means that the component is contained in the amount of 50% by mass or more of polymer components in terms of a solid content.

Examples of the polysulfone-based resin include polysulfone and polyethersulfone.

Although a vinylidene fluoride-based resin will be described below, the polymer component composing the porous membrane of the present disclosure is not limited to the vinylidene fluoride-based resin.

The term "vinylidene fluoride-based resin" refers to a homopolymer of vinylidene fluoride or a copolymer containing vinylidene fluoride in a weight ratio of 50% or more. The vinylidene fluoride-based resin is preferably a copolymer because of its excellent flexibility. When the vinylidene fluoride-based resin is a copolymer, any of well-known monomers can be appropriately selected and used as a monomer to be copolymerized with a vinylidene fluoride monomer. Examples of preferred monomers include, but are not limited to, fluorine-based monomers such as tetrafluoroethylene, trifluoroethylene, and hexafluoropropylene; and chlorine-based monomers such as chlorotrifluoroethylene, for example.

It is known that, in general, when raw water containing a large amount of turbidity is filtered, unfiltered deposit accumulates on the surface of the membrane or in the membrane while a filtration is continued. This will cause a new filtration resistance, resulting in a reduction in the filtration capacity. Hence, an operation is carried out, such as flushing in which the deposit is removed by a stream of water at a high flow rate without carrying out filtration during the filtration operation, air scrubbing in which the membrane is vibrated by collision of air bubbles to the membrane to thereby remove the deposit, and backwashing in which filtration is carried out in the opposite direction to clean the membrane. Particularly, for a membrane made from a high flexible copolymer, air scrubbing can induce strong vibrations to thereby remove the deposit efficiently.

It is to be noted that the weight-average molecular weight (Mw) of the vinylidene fluoride-based resin is not particularly limited, yet it is preferably 100,000 or more and 1,000,000 or less, and more preferably 150,000 or more and 900,000 or less. Further, the vinylidene fluoride-based resin is not limited to a vinylidene fluoride-based resin having a single molecular weight, and may be a mixture of a plurality of vinylidene fluoride-based resins having different molecular weights. In the present embodiment, the weight average molecular weight (Mw) can be measured by gel permeation chromatography (GPC) using standard resins having known molecular weights as references.

The porous membrane preferably contains, but is not particularly limited to, the vinylidene fluoride-based resin in the amount of 80% by mass or more and 99.99% by mass or less, in the polymer components.

The porous membrane may contain an additional polymer component. The additional polymer component is preferably, but not particularly limited to, compatible with the vinylidene fluoride-based resin, and a fluorine-based resin or the like having a high chemical resistance comparable to the chemical resistance of the vinylidene fluoride-based resin can be suitably used, for example.

The porous membrane preferably contains a hydrophilic resin as the additional polymer component. A preferred hydrophilic resin is polyethylene glycol (sometimes referred to as polyethylene oxide) having a weight-average molecular weight (Mw) of 20,000 or more and 300,000 or less, and polyvinyl pyrrolidone having a K-value, which is an index of molecular weight, of 17 or more and 120 or less. In the present embodiment, K-values can be determined in accordance with JIS K7367-2.

When the hydrophilic resin is polyethylene glycol, polyethylene glycol is preferably contained in the amount of 0.01 parts by mass or more and 4.0 parts by mass or less, with respect to 100 parts by mass of the vinylidene fluoride-based resin. Polyethylene glycol is contained in the amount of desirably 0.01 parts by mass or more and 3.5 parts by mass or less, and more desirably 0.01 parts by mass or more and 3.0 parts by mass or less. When the porous membrane contains polyethylene glycol in such a manner, the hydrophilicity at the surfaces of the membrane is increased and water molecule layers are more likely to be formed on the surfaces of the membrane when the membrane is brought into contact with an aqueous solution. The water molecule layers formed on the surfaces of the membrane are expected to reduce the frequency of contacts between the polymer component composing the porous membrane and a chemical cleaning agent, and consequently the chemical resistance of the porous membrane can be improved.

Here, if the weight-average molecular weight (Mw) of polyethylene glycol is less than 20,000, elution from the membrane tends to increase. On the other hand, if the weight-average molecular weight (Mw) of polyethylene glycol exceeds 300,000, a portion in which polyethylene glycol is contained in a spherical form is generated in the porous body forming the porous membrane, and the strength of the porous body tends to decrease.

On the other hand, if the content of polyethylene glycol is less than 0.01 part by mass, a water molecule layer tends to be difficult to form, and if the content exceeds 4.0 parts by mass, polyethylene glycol excessively attracts water molecules, causing swelling of the membrane, and the amount of permeated water tends to decrease. The content is preferably 0.1 part by mass or more, and more preferably 0.3 part by mass or more.

The form of how polyethylene glycol is included is not particularly limited to the above-described form. For example, polyethylene glycol molecules may be provided only in a surface layer of the porous body by coating, graft polymerization, or the like. From the viewpoint of improving the long-term chemical resistance, it is more preferable that at least a part of polyethylene glycol molecules are embedded in the skeleton of the porous body. Any form provides the effect of improving the chemical resistance. However, in the case where polyethylene glycol is applied to the surface layer of the porous body by coating or the like, polyethylene glycol is eluted over time when the porous body is used in water. Or, in the case where polyethylene glycol is physically bonded to the surface layer of the porous body by graft polymerization or the like, the bonding is cut by a chemical cleaning agent during cleaning of the membrane. In these cases, maintaining the effect of improving the long-term chemical resistance tends to be difficult.

Although the form of inclusion has been described in cases where polyethylene glycol is used as the hydrophilic resin, this is not limiting.

The porous membrane may be formed so as to have a membrane structure of a hollow fiber membrane, for example. In other words, this is a form of a hollow fiber membrane.

As used herein, the term "hollow fiber membrane" refers to a membrane in the form of a hollow ring. In a porous membrane having a membrane structure of a hollow fiber membrane, the membrane area per volume of module increases as compared to a flat membrane.

The porous membrane of the present embodiment, however, is not limited to a porous membrane having a membrane structure of a hollow fiber membrane (porous membrane in the form of a hollow fiber porous membrane), and may have a different membrane structure such as a flat membrane or a tubular membrane.

In the field of water treatment, it is required to remove viruses, bacteria, and the like. In the above-mentioned porous membrane, the other surface described above is used so as to be on the raw water side, and the pore diameter in the surface on the raw water side is set to 50 nm or less. As a result, the porous membrane can suppress reduction in the water permeability performance while exhibiting a high blocking performance.

The pore diameter in the other surface is more preferably 5 nm or more and 60 nm or less, even more preferably 5 nm or more and 40 nm or less, and particularly preferably 5 nm or more and 35 nm or less. In the present specification, the term "pore diameter in the other surface" refers to the pore diameter in the top surface of the other surface, unless otherwise specified.

Further, the porous membrane preferably has a three-dimensional network structure. When the porous membrane has a three-dimensional network structure, adjacent pores have good communicability to each other. Consequently, the resistance of water when water passes through the porous membrane is reduced, which enables the porous membrane to exhibit a high water permeability performance. The communicability can be expressed by the ratio of the thickness of the porous membrane to the pure water permeability. For example, this ratio reduces in a structure in which spherical crystals are connected or in a closed-cell structure in which the communicability between pores is small because the resistance is increased in the thickness portion. On the other hand, this ratio increases in a three-dimensional network structure. The pure water permeability is preferably 1000 LMH or more, and more preferably 1200 LMH or more. The pure water permeability is even more preferably 1400 LMH or more.

The water permeability coefficient P of the porous membrane is defined as the ratio of the thickness to the pure water permeability of the porous membrane, namely, $P=F/D$, where D represents the thickness and F represents the pure water permeability of the porous membrane. In the present embodiment, a porous membrane having a water permeability coefficient P of 3000 $L/m^2/hr/mm$ or more has a three-dimensional network structure and can exhibit a high-water permeability performance. The water permeability coefficient is preferably 3500 $L/m^2/hr/mm$ or more, and more preferably 4000 $L/m^2/hr/mm$ or more.

Further, the thickness is 150 μm or more, and more preferably 160 μm or more. When the thickness is 150 μm or more, the structure of the porous membrane can be maintained against pressures during filtration.

When the above-mentioned porous membrane has a membrane structure of a hollow fiber membrane, in most cases, an external pressure filtration method capable of ensuring a large filtration area is employed. For this reason, the porous hollow fiber membrane is required to have a high strength, i.e., a high compressive strength, against an external pressure such that the hollow fiber membrane does not crush during a filtering operation. The porous membrane of the present embodiment can have a compressive strength of 0.30 MPa or more. The hollow fiber membrane having a compressive strength of 0.30 MPa or more does not crush even when an instantaneous pressure is exerted in the direction of the external pressure.

Further, in the field of water treatments in which an operating pressure is exerted for long time, a compression creep resistance capable of maintaining the shape of a porous membrane for long time is required for an external pressure filtration method. For an internal pressure filtration method, a burst creep resistance is required. Although a compressive creep resistance will be described as the primary effect of the porous membrane in the present specification, applications of the porous membrane of the present embodiment are not limited to applications to the external pressure filtration method.

The compressive creep resistance was evaluated using a compressive creep coefficient. When the surface pore diameter index is large, a flow into the top surface of the inner surface (one surface in the case of external pressure filtration method) of the hollow fiber membrane abruptly changes, so that the load on the top surface is reduced and crush caused by the compressive creep can be suppressed. The compression creep factor is preferably −0.014 or more, and more preferably −0.012 or more. The compression creep factor is particularly preferably to −0.010 or more.

In the present porous membrane, when the ratio of the pore diameter in the top surface to the pore diameter in the second top surface (i.e., surface pore diameter index= average pore diameter in the top surface/average pore diameter in the second top surface), of the surface on the filtrate side (one surface), is 2.5 or more, a high compression creep resistance can be exhibit. The surface pore diameter index is more preferably 2.8 or more, and particularly preferably 3.0 or more.

Further, from the viewpoint of suppressing an abrupt structural change of the porous membrane, the surface pore diameter index may be 30 or less, and preferably 25 or less.

As used herein, the term "pore diameter in the second top surface" refers to the pore diameter of a pore which is observed closest to the one surface, among pores which are observable inside a pore in the top surface when viewed in the thickness direction. Specifically, when a plurality of pores are observable inside a pore in the top surface when viewed in the thickness direction, the term "pore diameter in the second top surface" refers to the pore diameter of a pore which has the smallest average position in the thickness direction of the portion defining the outer contour line of the pore, relative to the one side, among these pores.

Further, when the porous membrane is made to have a membrane structure of a hollow fiber membrane, a hollow portion of the hollow fiber membrane preferably has an inside diameter of 0.10 mm or more and 5.0 mm or less, and an outside diameter of 0.15 mm or more and 6.0 mm or less.

The virus blocking performance of the porous membranes can be measured by using *E. coli* phage MS-2. As a test procedure, for example, an indicator virus in a predetermined size is incubated. A virus stock solution is then prepared in distilled water so that the indicator virus is contained in a concentration of about $1.0×10^7$ pfu/mL, and the entire solution is filtered. LRV is expressed by the common logarithm of the ratio of the virus concentration in the stock solution in the denominator to the virus concentration in the filtrate in the numerator. The porous membrane of the present embodiment has an LRV of preferably 1.5 or more, and more preferably 2.0 or more.

In order to further improve the water permeability performance, preferably, the porous membrane is used so that the other surface having a smaller diameter is on the raw water side, and the pore diameter on the filtrate side is made greater than the pore diameter on the raw water side. This can reduce the resistance when a liquid permeates in the cross-sectional direction of the membrane, to thereby increase the water permeability performance. The smaller pore diameter on the raw water side can suppress clogging of substances causing membrane stains in the cross-sectional direction of the membrane.

The pore diameter in the top surface of the one surface of the porous membrane is preferably 1.0 µm or more and 200 µm or less, more preferably 2 µm or more and 180 µm or less, and particularly preferably 5 µm or more and 160 µm or less, from the viewpoint of the filtering performance.

The average pore diameter on the side of the surface having a greater pore diameter (one surface side) may be 30 times or more of the average pore diameter on the side of the surface having a smaller pore diameter (the other surface side). This structure enables the porous membrane to exhibit a high water permeability performance. This ratio is preferably 40 times or more and 3000 times or less. The ratio is more preferably 50 times or more and 2500 times or less. When the ratio is within one of these ranges, a high compressive strength can be exhibited together with a high water permeability performance.

Further, in the pore diameter profile in the thickness direction, when the position of the surface on the raw water side (other surface) and the position of the surface on the filtrate side (the one surface) in the thickness direction are defined as 0 and 1, respectively, and the thickness of the porous membrane is divided into 10 regions for normalizing positions in the thickness direction as thickness positions, the cross-sectional pore diameter in a region with a thickness position of 0.9 to 1.0 is preferably 0.5 µm or more, because a high water permeability performance can be exhibited. When the cross-sectional pore diameter in the region of 0.9 to 1.0 is 0.5 µm or more, the resistance during filtration is reduced, and substances that may reduce the membrane performance is prevented from depositing in the cross-sectional direction of the membrane, so that a reduction in the water permeability performance can be suppressed. The cross-sectional pore diameter in the region of 0.9 to 1.0 is more preferably 0.6 µm or more, and particularly preferably 0.8 µm or more.

The porous membrane of the present embodiment may be composed of a single layer or may have a multilayered structure having two or more layers.

Next, a method of manufacturing a porous membrane according to the present embodiment will be described.

The porous membrane of the above embodiment is preferably manufactured by a so-called wet membrane forming method or a so-called dry/wet membrane forming method. In the former, a membrane-forming stock solution (spinning stock solution) containing at least a hydrophobic polymer component mainly composed of preferably a vinylidene fluoride-based resin, more preferably a copolymer containing 50% or more of vinylidene fluoride in a weight ratio, or a polysulfone-based resin; a hydrophilic polymer component; and a common solvent of the hydrophobic and hydrophilic polymer components, is discharged from a molding nozzle and is solidified in a solution containing water as a main component. In the latter, after the membrane-forming stock solution is discharged from the molding nozzle, it is made to travel in a predetermined free traveling section. As used in the present disclosure, the term "hydrophobic polymers" and "hydrophilic polymers" are defined as polymers having a critical surface tension (γc) of 50 mN/m or more, and polymers having a critical surface tension of less than 50 mN/m, respectively, at 20° C.

As a copolymerizable monomer to be copolymerized with a vinylidene fluoride monomer, a known monomer can be appropriately selected and used, and examples thereof include, but are not particularly limited to, fluorine-based monomers such as tetrafluoroethylene, trifluoroethylene, and hexafluoropropylene, and chlorine-based monomers such as chlorotrifluoroethylene, for example.

If necessary, the membrane-forming stock solution may contain a non-solvent of the hydrophobic polymer.

In the manufacturing method of the present embodiment, first, a stock solution for forming a porous membrane is prepared, in which a hydrophobic polymer component for forming the porous membrane mainly composed of a vinylidene fluoride-based resin and a hydrophilic polymer component as a hydrophilizing component are dissolved in a common solvent of the hydrophobic and hydrophilic polymer components.

The hydrophobic polymer component for forming the porous membrane may be a vinylidene fluoride-based resin having a single molecular weight, or a mixture of a plurality of vinylidene fluoride-based resins having different molecular weights. Further, in order to improve the properties of the porous membrane, one or more additional polymers may be blended to the hydrophobic polymer component, without being limited to hydrophobic polymers.

In the case where an additional polymer is blended, the additional polymer is not particularly limited as long as it is compatible with the vinylidene fluoride-based resin. For example, a hydrophilic polymer can be used when imparting hydrophilicity to the membrane is desirable, or a hydrophobic polymer, preferably a fluorine-based polymer, can be used when even higher hydrophobicity is desirable. In the case where the additional polymer is blended, the vinylidene fluoride-based resin is contained in the amount of 80% by mass or more, preferably 90% by mass or more, in terms of a solid content of all the polymer components.

In the manufacturing method of the present embodiment, the hydrophilic polymer component to be blended in the membrane-forming stock solution as the hydrophilizing component is preferably polyethylene glycol (sometimes referred to as polyethylene oxide) having a weight-average molecular weight (Mw) of 20,000 or more and 150,000 or less. If polyethylene glycol having a weight-average molecular weight of less than 20,000 is used, a porous membrane can still be produced but formation of a porous membrane having pore diameters which satisfy the conditions of the present disclosure tends to be difficult. If the weight-average molecular weight exceeds 150,000, uniformly dissolving polyethylene glycol into the spinning stock solution together with the vinylidene fluoride-based resin, which is the main component of the hydrophobic polymer component forming the porous membrane, tends to be difficult. From the viewpoint of obtaining a spinning stock solution having an excellent membrane-forming property, the weight-average molecular weight of polyethylene glycol is more preferably 20,000 or more and 120,000 or less. It is to be noted that, from the viewpoint of obtaining a spinning stock solution having an excellent membrane-forming property and balancing the crystallinity and the specific surface area, the ratio of polyethylene glycol in the hydrophilic polymer component is preferably 80% by mass or more, more preferably 90% by mass or more, and even more preferably 95% by mass or more, in terms of a solid content of the hydrophilic polymer component.

Although polyethylene glycol is preferably used as the hydrophilic polymer component in the manufacturing method of the present disclosure as described in the above embodiment, the present disclosure is not limited to polyethylene glycol and polyvinyl pyrrolidone or partially-saponified polyvinyl alcohols may be used. Further, two or more hydrophilic polymer components may be blended.

The hydrophilic polymer component satisfying the above requirements may be prepared by using a polymer available as an industrial product alone, or by mixing a plurality of polymers, or may be produced as a component having a weight-average molecular weight which is adjusted by chemically or physically treating a raw material with a larger weight-average molecular weight.

Example of the non-solvent of the hydrophobic polymer include water and alcohol compounds. Of these, glycerin is preferable from the viewpoint of easiness of preparation of the membrane-forming stock solution, favorable distributing property of the hydrophilic polymer, low occurrence of compositional change during storage, ease of handling, and the like.

The water content of the hydrophilic polymer is preferably 3.0% by mass or less, more preferably 2.5% by mass or less, and even more preferably 2.0% by mass or less. This is because when the content of water as a non-solvent is low in the hydrophilic polymer forming the dilute phase in phase separation, the variation in time of the phase separation can be reduced. The water content can be measured using an infrared water meter or a Karl Fischer titration.

Further, the mixing ratio of the hydrophobic polymer component and the hydrophilic polymer component in the membrane-forming stock solution is not particularly limited, but it is preferable that the hydrophobic polymer component is 20% by mass or more and 40% by mass or less, the hydrophilic polymer component is 8% by mass or more and 30% by mass or less, and the balance is a solvent. It is more preferable that the hydrophobic polymer component is 23% by mass or more and 35% by mass or less, the hydrophilic polymer component is 10% by mass or more and 25% by mass or less, and the balance is a solvent. By forming a porous membrane using a membrane-forming stock solution of the mixing ration within one of these ranges, the residual amount of the hydrophilic polymer component can be easily adjusted to a predetermined amount, and it becomes easy to obtain a porous membrane having high strength, excellent chemical resistance, and water permeability.

Further, in the above-mentioned manufacturing method, it is preferable that the temperature of the solution containing water as a main component for solidifying the membrane-forming stock solution (Tb ° C.) and the temperature of the membrane-forming stock solution (Td ° C.) satisfy the relationship: Tb≤Td+50 during manufacturing, and the turbidity point temperature (Tc ° C.) of the membrane-forming stock solution satisfies the relationship of Tc≤Tb. When a membrane is formed under conditions satisfying such relationships of the temperature ranges, a porous membrane having a high water permeability is obtained, and the diffusion rate of the liquid to be coagulated increases so that coagulation is completed with at least a part of the hydrophilic polymer component embedded in the skeleton of the porous body. Consequently, the amount of the remaining hydrophilic polymer component can be adjusted to a desired range.

Further, the temperature (Td ° C.) and the turbidity point temperature (Tc ° C.) of the membrane-forming stock solution preferably satisfy Td>Tc+10° C. The condition makes the stock solution to be uniform, and a membrane formed under the condition has reduced variation in the surface pore diameter index and has extended creep life.

Further, when a hollow fiber porous membrane is manufactured by the above-mentioned manufacturing method, preferably, a double-tubular nozzle is used as a molding nozzle for manufacturing so that the membrane-forming stock solution is extruded together with a hollow forming agent from the double-tubular nozzle, and is solidified in a solution bath storing the above-mentioned solution. This facilitates manufacturing of a porous membrane having a membrane structure of a hollow fiber membrane. As the double-tubular molding nozzle and the hollow forming agent, those commonly used in the art may be used without particular limitation. In this specification, a porous membrane having a membrane structure of a hollow fiber membrane is also referred to as a "porous hollow fiber membrane".

FIG. 1 illustrates an example of a manufacturing apparatus for manufacturing porous hollow fiber membranes. The apparatus for manufacturing porous hollow fiber membranes includes a double-tubular molding nozzle 10, a solution bath 20 which stores a solution for solidifying a membrane-forming stock solution, a container 30 for covering a free traveling section through which the membrane-forming stock solution discharged from the molding nozzle 10 travels until it reaches the solution in the solution bath 20, and a plurality of rollers 50 for conveying and winding a porous hollow fiber membrane 40. The first roller is a first in-water roller 60.

The membrane-forming stock solution extruded from the double-tubular molding nozzle 10 travels through the free traveling section and is made to pass through the solution bath 20. Desirably, the time during which the membrane-forming stock solution travels through the free traveling section is 0.2 to 10 seconds. Further, in order to form a hollow portion, the hollow forming agent is poured into the innermost annular ring of the double-tubular molding nozzle 10. The hollow forming agent may be an aqueous solution in which a common solvent of the film forming stock solution and water are blended so that the common solvent is included in a mass ratio of 25 to 95 (where the mass ratio is the ratio of the common solvent in terms of % by mass with respect to the aqueous solution). By using an aqueous solution blended in such a manner, the pore diameter on the inner surface side of the porous hollow fiber membrane can be controlled. Here, if the mass ratio is 25 or more, the pore diameter on the inner surface (here, the surface having a larger pore diameter) side can be made 30 times or more of the pore diameter on the outer surface (here, the surface having a smaller pore diameter) side, to thereby exhibit a high water permeability performance. In contrast, if the mass ratio is more than 95, solidification on the inner surface side is slow, making spinning stability extremely poor.

The residence time of the membrane-forming stock solution in the solution bath (in the solution) is preferably 5.0 seconds or longer. When the residence time in the solution bath is set to 5.0 seconds or longer, it is possible to guarantee the time necessary for the common solvent of the membrane-forming stock solution present in a region ranging from the middle of the thickness to the inner surface to diffuse to the non-solvent in the solution bath, and to be exchanged. Accordingly, solidification is accelerated and phase separation is stopped in a moderate state. Consequently, the communicability of the membrane structure of the cross section is improved. Further, when the residence time is long, the time for the porous membrane to shrink in the vicinity of the outer surface in the cross section is extended. Consequently, it is possible to form a membrane having pores with a pore diameter of 0.5 μm or more in a region with a thickness position of 0.9 to 1, when the thickness position of the other surface and the thickness position of the one surface in the thickness direction are defined as 0 and 1, respectively, and the thickness of the porous membrane is divided into 10 regions for normalizing positions in the thickness direction as thickness positions.

The residence time is more desirably 5.0 seconds or longer and 50 seconds or shorter. When the residence time is 50 seconds or shorter, the process can be shortened and simplified. The residence time is more desirably 6.0 seconds or longer and 45 seconds or shorter. The solution bath may have a single stage or two or more stages, depending on the purpose. In the case of multiple-stage bath, the sum of the residence time in each stage may be within one of the above ranges.

In the solution bath of the membrane-forming stock solution, the residence time from the time when the membrane-forming stock solution reaches the solution bath to the time when the membrane-forming stock solution reaches the first in-water roller is preferably 3.0 seconds or longer. When the time is 3.0 seconds or longer, the hollow fiber membrane is bent after the membrane-forming stock solution is solidified, so that the ratio of the pore diameter in the top surface to the pore diameter in the second top surface remains unchanged. Consequently, the variation in the surface pore diameter index in the circumferential direction of the cross-section of the hollow fiber membrane is reduced, and a high creep resistance can be exhibited.

In contrast, if the arrival time to the first in-water roller is short and the time for solidification is insufficient, the membrane would solidify on the surface but would not solidify inside. Consequently, when the membrane is bent by the roller, the pores inside the membrane are stretched, which tends to reduce the difference between the pore diameter in the top surface and the pore diameter in the second top surface. The arrival time is more preferably 3.5 seconds or longer.

The holding angle of the hollow fiber membrane by the first in-water roller is 30° or more and 145° or less. As used herein, the term "holding angle of a hollow fiber membrane by the first in-water roller" refers to the smaller one of the angles formed by the line defined by a fiber made of the membrane-forming stock solution before it contacts the first in-water roller and the line defined by a fiber made of the membrane-forming stock solution away from the first in-water roller. When the holding angle is 30° or more, the hollow fiber membrane can be manufactured stably without slackness of the hollow fiber membrane or detachment from the rollers since the contacting area between rollers and the hollow fiber membrane can be guaranteed.

When the holding angle is 145° or less, pores inside the surface opposite to the rollers are not stretched so that the pore size index becomes small and a high creep resistance surface can be exhibited. The holding angle is preferably 40° or more and 140° or less, and more preferably 45° or more and 135° or less. The material of the rollers is not particularly limited.

The hollow fiber membrane of the present embodiment has a high creep resistance when the difference between the surface pore diameter index of the inner surface which was on the roller side during manufacturing of the membrane and the surface pore diameter index of the inner surface which was on the side opposite to the roller during manufacturing of the membrane of 1.3 or less. The difference is preferably 1.2 or less, more preferably 1.1 or less, and particularly preferably 0.8 or less. In the hollow fiber membrane of the present embodiment, it is also preferable that the difference in the surface pore diameter indices at any two points of the inner surface in the cross section satisfy the above ranges.

The temperature of the solution bath is not particularly limited as long as the relationships described above are satisfied, but is preferably 45° C. or higher and 95° C. or lower, more preferably 50° C. or higher and 90° C. or lower. When a plurality of solution baths are provided, the temperature condition in each solution bath may be varied.

In addition, a container for controlling the temperature and the humidity may be provided in the free traveling section. Regarding this container, no particular limitations are placed on the shape and the like, yet it may have, for example, a rectangular parallelepiped shape or a columnar shape, or it may or may not be sealed.

The temperature environment of the free traveling section is preferably 3° C. or higher and 90° C. or lower. Within this range, stable temperature control is possible and spinnability can be maintained. The temperature environment is more preferably 5° C. or higher and 85° C. or lower. Also, the relative humidity is in the range of 20% to 100%.

Further, the common solvent used for the membrane-forming stock solution is not particularly limited as long as it dissolves the above-mentioned hydrophobic and hydrophilic polymer components, and any well-known solvent in the art may be suitably selected and used. From the viewpoint of improving the stability of the membrane-forming stock solution, as the common solvent, it is preferable to use at least one solvent selected from the group consisting of N-methylpyrrolidone (NMP), dimethylformamide (DMF), dimethylacetamide (DMAc), and dimethylsulfoxide (DMSO). Also, a mixed solvent of at least one common solvent selected from the above group and another solvent may be used. In this case, it is preferable to use a mixed solvent containing the common solvent selected from the above group such that the total amount of the common solvent is preferably 80% by mass or more, and more preferably 90% by mass or more, with respect to the total amount of the mixed solvent.

The membrane-forming stock solution used for the method of manufacturing a porous membrane of the present embodiment has a viscosity of preferably 50 Pa·s or more and 200 Pa·s or less, and more preferably 60 Pa·s or more and 190 Pa·s or less, at a temperature where the membrane-forming stock solution is discharged from the double-tubular molding nozzle 10. When the viscosity of the solution is 50 Pa·s or more, the membrane-forming stock solution discharged from the double-tubular molding nozzle 10 upon manufacturing a porous hollow fiber membrane can travel freely for long time without falling due to its own weight. In addition, because of a reduction in the rate of phase separation, time for phase separation is also extended. Consequently, the pore diameter is increased in the cross section of the membrane, particularly on the inner surface side where dispersion of the non-solvent in the bath is delayed. Further, by setting the mass ratio of the hollow forming agent within one of the viscosity ranges, the surface pore diameter index can be increased. When the viscosity is 200

Pa·s or less, the membrane-forming stock solution can be extruded from the double-tubular molding nozzle 10 stably at a constant flow rate, which tends to reduce variation in the membrane performance.

When the ratio of the outermost diameter of the discharge port of the molding nozzle 10 and the outside diameter of the porous hollow fiber membrane is defined as the drawing ratio (=the outermost diameter of the discharge port/the outside diameter of the porous hollow fiber membrane), the drawing ratio is preferably 1.00 or more.

When the membrane-forming stock solution having a viscosity in one of the above ranges, voids are likely to be generated in the cross section of the porous hollow fiber membrane, particularly in the vicinity of the outer surface in the cross section since the phase separation rate is high. However, formation of voids can be suppressed by setting the drawing ratio to 1.00 or more so that a three-dimensional network structure is formed.

After the membrane is formed, a heat treatment may be performed as necessary. The temperature of the heat treatment is preferably 45° C. or higher and 100° C. or lower, and more preferably 50° C. or higher and 95° C. or lower. One of these temperature ranges allows a heat treatment to be carried out without causing significant reduction in the water permeability.

By using these manufacturing methods, a porous hollow fiber membrane can be easily and stably manufactured which has a high blocking performance, is excellent in the water permeability performance and strength, and enables stable flirtation operations for long time, which cannot be achieved by a conventional porous membrane.

EXAMPLES

The present disclosure will now be described in more details with reference to examples and comparative examples, yet it is noted that the present disclosure is not limited to these examples.

Here, a porous hollow fiber membrane composed of a porous membrane (hereinafter, sometimes simply referred to as "hollow fiber membrane") of each of the examples and comparative examples of the present disclosure was produced and evaluated.

The measurement methods used in the examples are as follows. The following measurements were all carried out at 25° C. unless otherwise stated.

Hereinafter, evaluation methods will be described, and then manufacturing methods and evaluation results in the examples and comparative examples will be described.

[1] Measurement of Outside and Inside Diameters (Mm)

A hollow fiber membrane was cut thinly with a razor or the like in a direction perpendicular to the longitudinal direction of the membrane. The longer and shorter diameters of the inside diameter of a cross section and the longer and shorter diameters of the outside diameter of the cross section were measured under a microscope. The outside and inside diameters were then calculated by the following expressions (2) and (3). The membrane thickness D is expressed by the following expression (4).

[Expression 2]

$$\text{Inside diameter [mm]} = \frac{\text{Inside longer diameter [mm]} + \text{Inside shorter diameter [mm]}}{2} \quad (2)$$

[Expression 3]

$$\text{Outside diameter [mm]} = \frac{\text{Outside longer diameter [mm]} + \text{Outside shorter diameter [mm]}}{2} \quad (3)$$

[Expression 4]

$$\text{Membrane Thickness [mm]} = \frac{\text{Outside diameter [mm]} - \text{Inside diameter [mm]}}{2} \quad (4)$$

[2] Pure Water Permeability (L/m²/Hr)

A wet hollow fiber membrane having a length of about 10 cm was sealed at one end. An injection needle was placed in the hollow portion at the other end. Pure water at 25° C. was injected from the injection needle into the hollow portion at a pressure of 0.1 MPa, and the amount of pure water permeating into the outer surface was measured. The pure water permeability F was then calculated by the expression (5) below. As used herein, the term "effective membrane length" refers to the net membrane length excluding the part where the injection needle is inserted.

[Expression 5]

$$\text{Pure water permeability}[L/m^2/hr] = \frac{60[\text{min}/hr] \times \text{Amount of permeated water}[L]}{\pi \times \text{Membrane inside diameter}[m] \times \text{Effective membrane length}[m] \times \text{Measurement time}[\text{min}]} \quad (5)$$

The water permeability coefficient P was calculated from the thickness D and the pure water permeability F measured as described above, on the basis of the relationship P (L/m²/hr/mm)=F/D.

[3] Compressive Strength (MPa)

A wet hollow fiber membrane having a length of about 5 cm was sealed at one end and the other end was opened to the atmosphere. Pressurized pure water at 40° C. was introduced from the outer surface, and permeated water was discharged from the other end opened to the atmosphere. In this case, a method of filtering the total amount of water fed to the membrane without circulation, i.e., a full-volume filtration method, was adopted.

The pressurizing pressure was raised at intervals of 0.01 MPa from 0.1 MPa and kept at each pressure for 15 seconds, during which the permeated water coming out from the other end opened to the atmosphere was collected. When the hollow portion of the hollow fiber membrane is not crushed, the absolute value of the amount (mass) of permeated water also increases as the pressurizing pressure increases. However, when the pressurizing pressure increases beyond the compressive strength of the hollow fiber membrane, the hollow portion collapses and clogging begins to take place. Accordingly, contrary to the increase in the pressurizing pressure, the absolute value of the amount of permeated water decreases. The pressurizing pressure at which the absolute value of the amount of permeated water is maximized was taken as the compressive strength.

[4] Compressive Creep Coefficient

A wet hollow fiber membrane having a length of about 5 cm was sealed at one end and the other end was opened to the atmosphere. Pressurized pure water at 40° C. was introduced from the outer surface, and permeated water was discharged from the other end opened to the atmosphere. In this case, a method of filtering the total amount of water fed to the membrane without circulation, i.e., a full-volume filtration method, was adopted.

A pressurizing pressure was set to the value obtained by subtracting 0.05 MPa from the compression strength, and the pressuring was continued until the hollow fiber membrane crushed. The hollow fiber membrane flattened in an elliptical shape after long time elapsed, and the hollow fiber membrane was determined to crush when it completely flattened. The test was performed three times in the similar manner, and the shortest time until the crush was taken as the crushing time.

Figure 2:
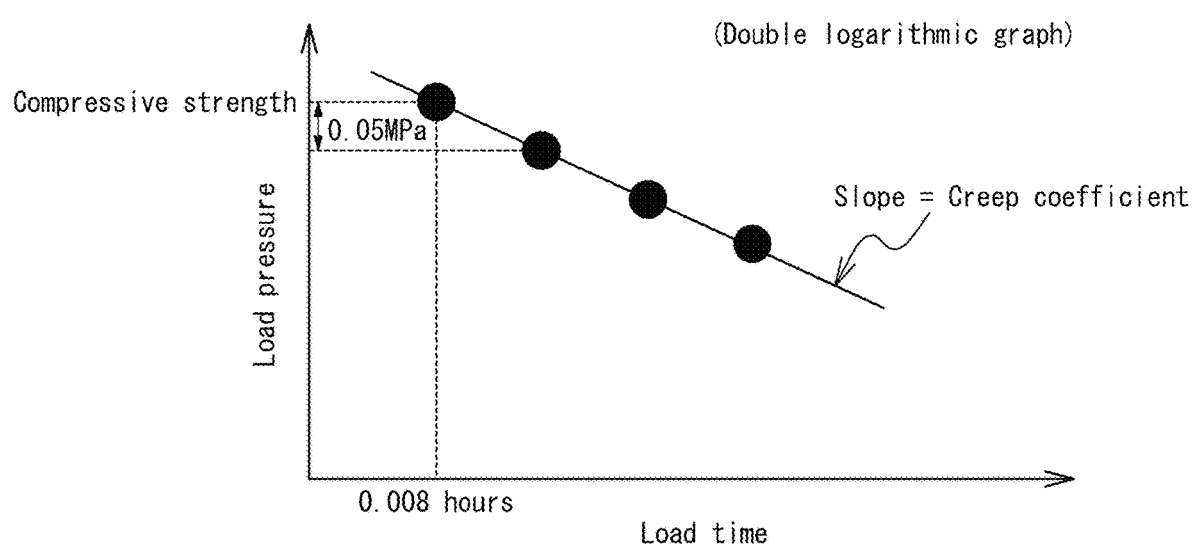
FIG. 2 is a schematic diagram illustrating how to calculate a compressive creep coefficient.

Next, on a double logarithmic graph having the load time on the horizontal axis and the load pressure on the vertical axis, the compressive strength in 0.008 hours and the compressive strength at the time when a crush occurred under the pressure obtained by subtracting 0.05 MPa from the compressive strength were plotted (2 points on the left out of 4 points in FIG. 2). A point of crush between 10 and 1000 hours was predicted by making extrapolation from these points to the long time side, to determine a subsequent pressurizing pressure. Two points were added according to this procedure. Then, the slope was calculated from four points in total, including the point of compression strength, using an approximate curve by the least-squares method. This slope was taken as the compressive creep coefficient. How the compressive creep coefficient was calculated is depicted in FIG. 2. A higher compressive creep coefficient indicates a higher compressive creep resistance.

[5] Pore Diameters (μm) in Inner and Outer Surface

Images of the outer surface and the inner surface of a hollow fiber membrane were taken under an electron microscope SU8000 series manufactured by Hitachi High-Tech Corporation at an accelerating voltage of 3 kV. The images were taken at a magnification at which shapes of 20 or more pores were observable, e.g., at a magnification of 250 times on the one surface (inner surface in this case) in Example 2.

For example, as described in WO 2001/53213, a transparent sheet was superimposed on a photocopy of the photographed image, and pore portions in the top surface were painted in black with a black pen or the like. Then, the transparent sheet was photocopied to a sheet of white paper, so that the pore portions in black were clearly distinguishable from non-pore portions in white. The image was then binarized by a discriminant analytical method using commercially-available image analysis software Winroof 6.1.3. The area occupied by the resultant binarized image was calculated to thereby determine the respective porosities in the one surface and the other surface.

The circle equivalent diameter was calculated for each pore present on the surface, and the pore area of each pore was summed in descending order of the pore diameter from the pore with the largest pore diameter. When the sum of the pore area reached 50% of the sum of the pore areas of all pores, the pore diameter of the pore that was added the last was taken as the pore diameter.

In addition, the ratio of the pore diameter in the top surface of the one surface to the pore diameter in the other surface was taken as the ratio of the average pore diameter in the top surface of the one surface and the average pore diameter in the other surface, which were determined as described above.

[6] Surface Pore Diameter Index (-)

An image of the one surface (inner surface in the examples) of the hollow fiber membrane was taken as in the manner described above in [5]. Then, pore portions in the top surface of the one surface were painted in black in the photographed image, and the pore diameters were calculated.

In addition, in the same image, among pores which could be observed in a pore in the top surface when viewed in the thickness direction, a pore which was observed closest to the other surface was taken as a pore in the second top surface, and the pore diameter of that pore was calculated.

Figure 3A:
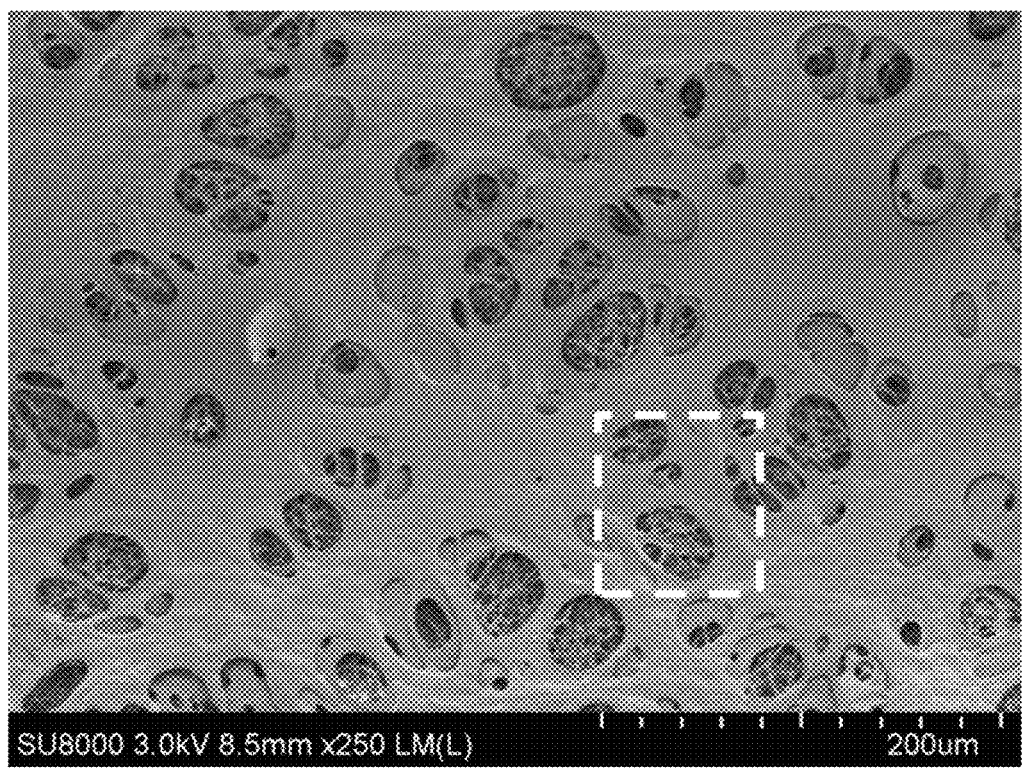
FIG. 3(A) is an electron microscope image (magnification: 250 times) of an inner surface of a porous membrane of Example 3.
Figure 3B:
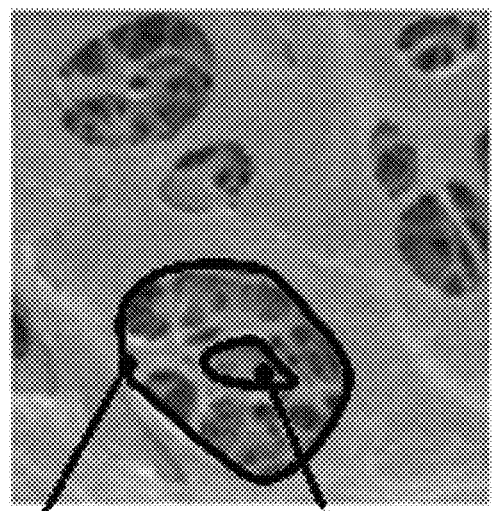
FIG. 3(B) depicts examples of a pore in the top surface and a pore in the second top surface of the inner surface of the porous membrane depicted in FIG. 3(A).

Examples of a pore in the top surface and a pore in the second top surface are depicted in FIG. 3(B). FIG. 3(B) is an enlarged view of an electron microscope image (magnification: 250 times) of the inner surface of the porous membrane of Example 3 depicted in FIG. 3(A).

The surface pore diameter index was calculated as the ratio of the pore diameter in the top surface to the pore diameter in the second top surface of the one surface. The surface pore size indices were calculated for both the surface on the roller side (see FIG. 1) and the surface on the side (see FIG. 1) opposite to the rollers during manufacturing of the hollow fiber membrane.

In the case where the one surface is the inner surface of the hollow fiber membrane, the surface on the roller side and the surface opposite to the rollers face to each other, having the center of the flow path in the hollow fiber membrane interposed therebetween. More specifically, the calculation point at the surface on the roller side and the calculation point at the surface on the side opposite to the rollers are opposite to each other, relative to the center of the flow path in the hollow fiber membrane in the cross section perpendicular to the direction where the hollow fiber membrane extends.

[7] Cross-Sectional Pore Diameter (μm)

The thickness position of the other surface and the thickness position of the one surface in the thickness direction were defined as 0 and 1, respectively, and the thickness of the porous membrane was divided into 10 regions (i.e., the region with a thickness position of 0 to 0.1, the region with a thickness position of 0.1 to 0.2, . . . , and the region with a thickness position of 0.9 to 1), for normalizing positions in the thickness direction as thickness positions. The pore diameters in the 10 regions were measured to analyze the pore diameter profile in the cross-section, and the cross-sectional pore diameter was calculated.

First, as described in WO 2001/53213, for example, a transparent sheet was superimposed on a photocopy of an image taken under a scanning electron microscope at a magnification at which shapes of 100 or more pores were observable in the cross section of the 10 divided sections of the cross section of a membrane, and pore portions were painted in black with a black pen or the like. Then, the transparent sheet was photocopied to a sheet of white paper, so that the pore portions in black were clearly distinguishable from non-pore portions in white. In the case where the periphery of a pore intersected the boundary for dividing the thickness positions in the cross section, that pore was excluded from the measurement.

The image was binarized by a discriminant analytical method using commercially-available image analysis software Winroof 6.1.3, and the areas of the pore portions were summed. The circle equivalent diameter was calculated for each pore, the circle equivalent diameters were sorted in descending order, and the pore area of each pore was summed in descending order of the pore diameter from the pore with the largest pore diameter. When the sum of the pore area reached one half of the sum of the pore areas of all pores, the pore diameter of the pore that was added the last was taken as the cross-sectional pore diameter.

The cross-sectional pore diameters in the region of the thickness position of 0.9 to 1.0 are summarized in Table 1.

[8] Virus Blocking Performance (-)

E. coli phage MS-2 (Bacteriophage MS-2 NBRC13965) (particle size of about 25 nm) was used for the test. The virus was incubated in E. coli to an order of $10^7$ pfu/mL, and an adjustment to pH 7 was performed by a 0.1 mM phosphoric acid buffer, to obtain a test raw liquid. The virus blocking performance of a porous hollow fiber membrane was evaluated by the following non-destructive test.

A porous hollow fiber membrane was made wet and then was cut to an effective length of about 12 cm. The porous hollow fiber membrane was secured inside a cylindrical case so that one end of the porous hollow fiber membrane was sealed and the other end was open. A liquid supply port was provided inside the case, 1000 ml of the phage solution was fed from the supply port under a pressure of 20 kPa so that the phage solution was filtered through the porous hollow fiber membrane from the outside to the inside. The filtrate was then removed from the open end of the porous hollow fiber membrane, and 20 ml of the final stream was sampled. E. coli phage MS2 in each of the test raw liquid and the sampled filtrate was quantified, and the blocking performance (removal performance) of E. coli phage MS2 was calculated from the following expression (6).

[Expression 6]

$$\text{Removal performance } (LRV) = -\log 10 \left\{ 1 - \left( \frac{MS2 \text{ in test raw liquid} - MS2 \text{ in filtrate}}{MS2 \text{ in test raw liquid}} \right) \right\} \quad (6)$$

The following [9] and [10] are measurement methods in examples where a PVDF resin was used as a hydrophobic polymer component.

[9] Determination of Polyethylene Glycol Content with Respect to 100% by Mass of PVDF Resin in Porous Membrane (Determination of Residual Amount of PEG in Membrane)

A $^1$H-NMR measurement of a porous membrane was carried out using d6-DMF as a solvent and tetramethylsilane as an internal standard (0 ppm) using an NMR measuring apparatus (Lambda 400 manufactured by JEOL Ltd.). In the obtained spectrum, from the integral (IPEG) of the signal derived from polyethylene glycol appearing around 3.6 ppm, and the integral (IPVDF) of the signal derived from a PVDF resin appearing around 2.3 to 2.4 ppm and 2.9 to 3.2 ppm, the polyethylene glycol content was calculated according to the following formula:

Polyethylene glycol content (% by mass)={44(IPEG/4)/60(IPVDF/2)}×100.

[10] Determination of Weight-Average Molecular Weight of Polyethylene Glycol in Porous Membrane In 10 mL of acetone, 0.1 g of a porous membrane was dissolved. The solution was dropped into 100 mL of water to cause the polymer composing the membrane to reprecipitate, to thereby isolate polyethylene glycol remained in the membrane as an aqueous solution. Thereafter, the solution containing polyethylene glycol was concentrated using an evaporator, and then was dissolved in a mobile phase solution described below to obtain a solution of polyethylene glycol. Using 200 ml of the resultant solution, a GPC measurement was carried out under the following conditions, and the weight-average molecular weight (in terms of polyethylene glycol standard sample) was determined.

Apparatus: HLC-8220GPC (Tosoh Corporation)

Column: Shodex SB-803HQ

Mobile phase: 0.7 mL/min of water solution of $KH_2PO_4$ (0.02 mM)+$Na_2HPO_4$ (0.02 mM)

Detector: Differential refractive index detector

[11] Measurement of Viscosity of Membrane-Forming Stock Solution

The membrane-forming stock solution stored in a jar was placed in a thermostatic bath, and the temperature of the solution was set to a temperature at which the solution is to be extruded from the double-tubular nozzle. The viscosity was measured using a Brookfield viscometer.

Next, manufacturing methods according to examples and comparative examples will be described.

Example 1

Into 59% by mass of N-methylpyrrolidone, 25% by mass of PVDF (KYNAR761 manufactured by Arkema Group) and 16% by mass of polyethylene glycol having a weight-average molecular weight of 35,000 (Polyethylene glycol 35000 manufactured by Merck) were dissolved at 80° C.

This membrane-forming stock solution was extruded from a double ring spinning nozzle together with an aqueous solution of 80% by mass of N-methylpyrrolidone as a hollow forming agent, coagulated in water at 83° C. by way of a free traveling distance, and then desolvented in water at 60° C. to obtain a porous hollow fiber membrane. The residence time to the first in-water roller in water at 83° C. was set to 4.0 seconds, and residence time in the solution bath was set to 25 seconds. The resultant porous hollow fiber membrane was subjected to a wet heat treatment at 60° C.

The properties of the membrane, including those in examples described later, are summarized in Table 1.

Example 2

A porous hollow fiber membrane was manufactured in the same manner as in Example 1 except that 10% by mass of PVDF (KYNAR761 manufactured by Arkema), 15% by mass of P(VDF-HFP) (KYNARFLEX LBG manufactured by Arkema), and 18% by mass of polyethylene glycol having a weight-average molecular weight of 35000 (Polyethylene glycol 35000 manufactured by Merck) were dissolved into 57% by mass of N-methylpyrrolidone at 80° C. to prepare a membrane-forming stock solution.

Example 3

A porous hollow fiber membrane was manufactured in the same manner as in Example 1 except that 25% by mass of P(VDF-HFP) (KYNARFLEX LBG manufactured by Arkema) and 18% by mass of polyethylene glycol having a weight-average molecular weight of 35000 (Polyethylene glycol 35000 manufactured by Merck) were dissolved into 57% by mass of N-methylpyrrolidone at 80° C. to prepare a membrane-forming stock solution.

FIG. 3(A) is an electron microscope image (magnification: 250 times) of the one surface (inner surface in this case) of the porous membrane (porous hollow fiber membrane) of Example 3.

Example 4

Into 59% by mass of N-methylpyrrolidone, 25% by mass of P(VDF-HFP) (KYNARFLEX LBG manufactured by Arkema) and 16% by mass of polyethylene glycol having a weight-average molecular weight of 35000 (Polyethylene glycol 35000 manufactured by Merck) were dissolved at 80° C. to prepare a membrane-forming stock solution. A porous hollow fiber membrane was manufactured in the same manner as in Example 1 except that residence time to the first in-water roller was set to 5.0 seconds.

Example 5

A porous hollow fiber membrane was manufactured in the same manner as in Example 3 except that the outside diameter and the inside diameter of the porous hollow fiber membrane were set to 0.9 mm and 0.5 mm, respectively.

Example 6

A porous hollow fiber membrane was manufactured in the same manner as in Example 3 except that the outside diameter and the inside diameter of the porous hollow fiber membrane were set to 1.1 mm and 0.6 mm, respectively.

Example 7

The porous hollow fiber membrane was manufactured in the same manner as in Example 3 except that the outside diameter and the inside diameter of the porous hollow fiber membrane were set to 1.1 mm and 0.6 mm, respectively, and the residence time to the first in-water roller was set to 3.5 seconds.

Example 8

The porous hollow fiber membrane was manufactured in the same manner as in Example 3 except that the outside diameter and the inside diameter of the porous hollow fiber membrane were set to 1.1 mm and 0.6 mm, respectively, and the holding angle by the first in-water roller was set to 30°.

Example 9

The porous hollow fiber membrane was manufactured in the same manner as in Example 3 except that the outside diameter and the inside diameter of the porous hollow fiber membrane were set to 1.1 mm and 0.6 mm, respectively, and the holding angle by the first in-water roller was set to 145°.

Comparative Example 1

A porous hollow fiber membrane was manufactured in the same manner as in Example 1 except that residence time to the first in-water roller in water at 83° C. was set to 2.0 seconds. Because the time to the first in-water roller was short, the surface pore diameter index was small on the one surface (inner surface) opposite to the roller, resulting in a reduced creep coefficient.

Comparative Example 2

A porous hollow fiber membrane was manufactured in the same manner as in Example 3 except that residence time to the first in-water roller in water at 83° C. was set to 2.0 seconds. Because the time to the first in-water roller was short, the surface pore diameter index was small on the one surface (inner surface) opposite to the roller, resulting in a reduced creep coefficient.

Comparative Example 3

The porous hollow fiber membrane was manufactured in the same manner as in Example 3 except that the holding angle by the first in-water roller was set to 20°. Because the holding angle was small, manufacturing of the hollow fiber membrane became unstable and no sample could be collected.

Comparative Example 4

The porous hollow fiber membrane was manufactured in the same manner as in Example 3 except that the outside diameter and the inside diameter of the porous hollow fiber membrane were set to 1.1 mm and 0.6 mm, respectively, and the holding angle by the first in-water roller was set to 150°. Because the holding angle was larger, the surface pore diameter index was small on the one surface (inner surface) opposite to the roller, resulting in a reduced creep coefficient.

TABLE 1

| | | | Example 1 | Example 2 | Example 3 | Example 4 | Example 5 |
|---|---|---|---|---|---|---|---|
| Hydrophobic polymer 1 | | — | — | P(VDF-HFP) | P(VDF-HFP) | P(VDF-HFP) | P(VDF-HFP) |
| Hydrophobic polymer 2 | | — | PVDF | PVDF | — | — | — |
| Common solvent | | — | NMP | NMP | NMP | NMP | NMP |
| Hydrophilic polymer | | — | PEG | PEG | PEG | PEG | PEG |
| Weight-avg. molecular weight of Hydrophilic polymer | | Mw | 35000 | 35000 | 35000 | 35000 | 35000 |
| Viscosity | | Pa · sec | 110 | 100 | 120 | 100 | 120 |
| Temperature of stock solution (Td) | | ° C. | 80 | 80 | 80 | 80 | 80 |
| Turbidity point temperature (Tc) | | ° C. | 50 | 40 | 30 | 30 | 30 |
| Hollow Forming agent | Common solvent | — | NMP | NMP | NMP | NMP | NMP |
| | Concentration | % by mass | 80 | 80 | 80 | 80 | 80 |
| Free traveling section | Vessel | — | Yes | Yes | Yes | Yes | Yes |
| Solution bath temperature (Tb) | | ° C. | 83 | 83 | 83 | 83 | 83 |

TABLE 1-continued

|  |  |  |  |  |  |  |
|---|---|---|---|---|---|---|
| Residence time in solution bath | seconds | 25 | 25 | 25 | 25 | 25 |
| Residence time to 1st in-water roller in solutions bath | seconds | 4.0 | 4.0 | 4.0 | 5.0 | 4.0 |
| Holding angle of hollow fiber membrane by the first in-water roller | — | 60 | 60 | 60 | 60 | 60 |
| Outside diameter of membrane | mm | 1.3 | 1.3 | 1.3 | 1.3 | 0.9 |
| Inside diameter of membrane | mm | 0.7 | 0.7 | 0.7 | 0.7 | 0.5 |
| Membrane thickness | mm | 0.3 | 0.3 | 0.3 | 0.3 | 0.2 |
| Pure water permeability | L/m$^2$/hr | 2200 | 2100 | 2000 | 1900 | 3000 |
| Water permeability coefficient | L/m$^2$/hr/mm | 7333 | 7000 | 6667 | 6333 | 15000 |
| Removal performance of MS2 | LRV | 4.0 | 4.0 | 4.0 | 4.0 | 4.0 |
| Compressive strength | MPa | 0.45 | 0.30 | 0.30 | 0.30 | 0.30 |
| Avg. pore diam. in other surface (outer surface) | nm | 20 | 20 | 20 | 20 | 20 |
| Avg. pore diam. in top surface of one surface (inner surface) | μm | 30 | 35 | 30 | 37 | 30 |
| Ratio of pore diam. in top surface of one surface (inner surface/pore diam. in other surface (outer surface) | — | 1500 | 1750 | 1500 | 1350 | 1500 |
| Cross-sectional pore diam in region of thickness position of 0.9 to 1.0 | μm | 1.8 | 1.9 | 1.7 | 1.6 | 1.7 |
| Avg. pore diam. in second top surface of one surface (inner surface) (on roller side) | μm | 7.1 | 8.1 | 6.7 | 8.4 | 7.9 |
| Surface pore diam. index of one surface (inner surface) (on roller side) | — | 4.2 | 4.3 | 4.5 | 3.2 | 3.8 |
| Avg. pore diam. in second top surface of one surface (inner surface) (opposite to rollers) | μm | 7.3 | 8.3 | 6.8 | 9.0 | 7.9 |
| Surface pore diam. index on one surface (inner surface) (opposite to rollers) | — | 4.1 | 4.2 | 4.4 | 3.0 | 3.8 |
| Difference between surface pore diam. index on roller side surface and surface pore diam. index on side opposite to rollers | — | 0.1 | 0.1 | 0.1 | 0.2 | 0 |
| Compressive creep coefficient | — | −0.0094 | −0.0094 | −0.0095 | −0.0095 | −0.0096 |

|  |  | Example 6 | Example 7 | Example 8 | Example 9 |
|---|---|---|---|---|---|
| Hydrophobic polymer 1 | — | P(VDF-HFP) | P(VDF-HFP) | P(VDF-HFP) | P(VDF-HFP) |
| Hydrophobic polymer 2 | — | — | — | — | — |
| Common solvent | — | NMP | NMP | NMP | NMP |
| Hydrophilic polymer | — | PEG | PEG | PEG | PEG |
| Weight-avg. molecular weight of Hydrophilic polymer | Mw | 35000 | 35000 | 35000 | 35000 |
| Viscosity | Pa · sec | 120 | 120 | 120 | 120 |
| Temperature of stock solution (Td) | ° C. | 80 | 80 | 80 | 80 |
| Turbidity point temperature (Tc) | ° C. | 30 | 30 | 30 | 30 |

TABLE 1-continued

| Hollow Forming agent | Common solvent | — | NMP | NMP | NMP | NMP |
|---|---|---|---|---|---|---|
| | Concentration | % by mass | 80 | 80 | 80 | 80 |
| Free traveling section | Vessel | — | Yes | Yes | Yes | Yes |
| Solution bath temperature (Tb) | | °C. | 83 | 83 | 83 | 83 |
| Residence time in solution bath | | seconds | 25 | 25 | 25 | 25 |
| Residence time to 1st in-water roller in solutions bath | | seconds | 4.0 | 3.5 | 4.0 | 4.0 |
| Holding angle of hollow fiber membrane by the first in-water roller | | — | 60 | 60 | 30 | 145 |
| Outside diameter of membrane | | mm | 1.1 | 1.1 | 1.1 | 1.1 |
| Inside diameter of membrane | | mm | 0.6 | 0.6 | 0.6 | 0.6 |
| Membrane thickness | | mm | 0.25 | 0.25 | 0.25 | 0.25 |
| Pure water permeability | | L/m$^2$/hr | 2800 | 2900 | 2700 | 2800 |
| Water permeability coefficient | | L/m$^2$/hr/mm | 11200 | 11600 | 10800 | 11200 |
| Removal performance of MS2 | | LRV | 4.0 | 4.0 | 4.0 | 4.0 |
| Compressive strength | | MPa | 0.35 | 0.35 | 0.35 | 0.35 |
| Avg. pore diam. in other surface (outer surface) | | nm | 20 | 20 | 20 | 20 |
| Avg. pore diam. in top surface of one surface (inner surface) | | μm | 30 | 33 | 29 | 31 |
| Ratio of pore diam. in top surface of one surface (inner surface/pore diam. in other surface (outer surface) | | — | 1500 | 1650 | 1450 | 1550 |
| Cross-sectional pore diam in region of thickness position of 0.9 to 1.0 | | μm | 1.7 | 1.8 | 1.8 | 1.7 |
| Avg. pore diam. in second top surface of one surface (inner surface) (on roller side) | | μm | 8.0 | 8.0 | 8.0 | 8.0 |
| Surface pore diam. index of one surface (inner surface) (on roller side) | | — | 3.8 | 3.8 | 3.8 | 3.8 |
| Avg. pore diam. in second top surface of one surface (inner surface) (opposite to rollers) | | μm | 8.1 | 11.4 | 7.8 | 9.1 |
| Surface pore diam. index on one surface (inner surface) (opposite to rollers) | | — | 3.7 | 2.9 | 3.7 | 3.4 |
| Difference between surface pore diam. index on roller side surface and surface pore diam. index on side opposite to rollers | | — | 0.1 | 0.9 | 0.1 | 0.4 |
| Compressive creep coefficient | | — | −0.0096 | −0.011 | −0.0095 | −0.0095 |

| | | | Comparative Example 1 | Comparative Example 2 | Comparative Example 3 | Comparative Example 4 |
|---|---|---|---|---|---|---|
| Hydrophobic polymer 1 | | — | — | — | P(VDF-HFP) | P(VDF-HFP) | P(VDF-HFP) |
| Hydrophobic polymer 2 | | — | — | PVDF | — | — | — |
| Common solvent | | — | — | NMP | NMP | NMP | NMP |
| Hydrophilic polymer | | — | — | PEG | PEG | PEG | PEG |
| Weight-avg. molecular weight of Hydrophilic | | Mw | — | 35000 | 35000 | 35000 | 35000 |

TABLE 1-continued

| | | | | | | |
|---|---|---|---|---|---|---|
| polymer | | | | | | |
| Viscosity | Pa · sec | 110 | 120 | 120 | 120 |
| Temperature of stock solution (Td) | ° C. | 80 | 80 | 80 | 80 |
| Turbidity point temperature (Tc) | ° C. | 50 | 30 | 30 | 30 |
| Hollow Forming agent — Common solvent | — | NMP | NMP | NMP | NMP |
| Concentration | % by mass | 80 | 80 | 80 | 80 |
| Free traveling section — Vessel | — | Yes | Yes | Yes | Yes |
| Solution bath temperature (Tb) | ° C. | 83 | 83 | 83 | 83 |
| Residence time in solution bath | seconds | 25 | 25 | 25 | 25 |
| Residence time to 1st in-water roller in solutions bath | seconds | 2.0 | 2.0 | 4.0 | 4.0 |
| Holding angle of hollow fiber membrane by the first in-water roller | — | 60 | 60 | 20 | 150 |
| Outside diameter of membrane | mm | 1.3 | 1.3 | — | 1.1 |
| Inside diameter of membrane | mm | 0.7 | 0.7 | — | 0.6 |
| Membrane thickness | mm | 0.3 | 0.3 | — | 0.25 |
| Pure water permeability | L/m$^2$/hr | 2200 | 2000 | — | 2900 |
| Water permeability coefficient | L/m$^2$/hr/mm | 7133 | 6667 | — | 11600 |
| Removal performance of MS2 | LRV | 4.0 | 4.0 | — | 4.0 |
| Compressive strength | MPa | 0.45 | 0.30 | — | 0.35 |
| Avg. pore diam. in other surface (outer surface) | nm | 20 | 20 | — | 20 |
| Avg. pore diam. in top surface of one surface (inner surface) | μm | 30 | 30 | — | 31 |
| Ratio of pore diam. in top surface of one surface (inner surface/pore diam. in other surface (outer surface) | — | 1500 | 1500 | — | 1550 |
| Cross-sectional pore diam in region of thickness position of 0.9 to 1.0 | μm | 1.8 | 1.7 | — | 1.8 |
| Avg. pore diam. in second top surface of one surface (inner surface) (on roller side) | μm | 7.1 | 8.8 | — | 8.0 |
| Surface pore diam. index of one surface (inner surface) (on roller side) | — | 4.2 | 3.4 | — | 3.8 |
| Avg. pore diam. in second top surface of one surface (inner surface) (opposite to rollers) | μm | 15.8 | 15.0 | — | 17.2 |
| Surface pore diam. index on one surface (inner surface) (opposite to rollers) | — | 1.9 | 2.0 | — | 1.8 |
| Difference between surface pore diam. index on roller side surface and surface pore diam. index on side opposite to rollers | — | 2.3 | 1.4 | — | 2.0 |
| Compressive creep coefficient | — | −0.016 | −0.015 | — | −0.015 | avg. = average.
diam. = diameter

REFERENCE SIGNS LIST

10 Double-tubular forming nozzle
20 Solution bath
30 Container
40 Porous hollow fiber membrane
50 Roller
60 First in-water roller

The invention claimed is:

1. A porous membrane comprising:
one surface to be on a side of a filtrate; and
an other surface opposed to the one surface and to be on a side of a liquid to be filtered,
wherein the porous membrane has a three-dimensional network structure comprising:
a top surface pore opening to the one surface;
inside pores situated inside the top surface pore; and
an other surface pore opening to the other surface, and
wherein a surface pore diameter index of the one surface is 2.5 or more, the surface pore diameter index being determined by dividing a pore diameter of the top surface pore by a pore diameter of a pore which is observed closest to the one surface among the inside pores when viewed in the thickness direction.

2. The porous membrane according to claim 1, wherein the pore diameter of the top surface pore in the one surface is 1.0 µm or more.

3. The porous membrane according to claim 1, wherein a ratio of the pore diameter of the top surface pore in the one surface to a pore diameter of the other surface pore in the other surface is 30 or more.

4. The porous membrane according to claim 1, wherein the pore diameter of the other surface pore in the other surface is 60 nm or less.

5. The porous membrane according to claim 1, wherein the porous membrane has a compressive strength of 0.30 MPa or more.

6. The porous membrane according to claim 1, wherein, when a thickness position of the other surface and a thickness position of the one surface in a thickness direction are defined as 0 and 1, respectively, and the thickness of the porous membrane is divided into 10 regions for normalizing positions in the thickness direction as thickness positions, a cross-sectional pore diameter in a region with a thickness position of 0.9 to 1.0 is 0.5 µm or more.

7. The porous membrane according to claim 1, wherein porous membrane has a compressive creep coefficient of −0.014 or more.

8. The porous membrane according to claim 1, wherein
the porous membrane is in a form of a hollow fiber membrane, and
a difference of surface pore diameter indices at two points of the one surface is 1.3 or less, the two point facing to each other, having a center of a flow path in the hollow fiber membrane interposed therebetween.

9. The porous membrane according to claim 1, wherein the porous membrane contains a vinylidene fluoride-based resin as a main component.

10. The porous membrane according to claim 1, wherein the porous membrane contains a copolymer of vinylidene fluoride and hexafluoropropylene, as the main component.

11. The porous membrane according to claim 1, wherein the porous membrane contains a copolymer of vinylidene fluoride and chlorotrifluoroethylene, as the main component.

* * * * *